(12) United States Patent
Book

(10) Patent No.: US 6,240,096 B1
(45) Date of Patent: May 29, 2001

(54) FIBRE CHANNEL SWITCH EMPLOYING DISTRIBUTED QUEUING

(75) Inventor: David Book, Thornhill (CA)

(73) Assignee: McData Corporation, Broomfield, CO (US)

( * ) Notice: Subject to any disclaimer, the term of this patent is extended or adjusted under 35 U.S.C. 154(b) by 0 days.

(21) Appl. No.: 09/481,437

(22) Filed: Jan. 12, 2000

Related U.S. Application Data

(63) Continuation of application No. 08/975,938, filed on Nov. 21, 1997, now abandoned, which is a continuation of application No. 08/714,029, filed on Sep. 11, 1996, now Pat. No. 5,894,481.

(51) Int. Cl.[7] ................................... H04Q 11/04
(52) U.S. Cl. .................. 370/412; 370/382; 370/396; 370/423
(58) Field of Search .................... 370/379, 380, 370/381, 382, 383, 412, 414, 416, 418, 422, 423, 424, 396, 397, 398, 399

(56) References Cited

U.S. PATENT DOCUMENTS

| 4,683,564 | * | 7/1987 | Young et al. | 370/380 |
|---|---|---|---|---|
| 5,233,603 | * | 8/1993 | Takeuchi et al. | 370/412 |
| 5,309,432 | * | 5/1994 | Kanakia | 370/412 |
| 5,519,695 | | 5/1996 | Purohit | 370/352 |
| 5,603,064 | | 2/1997 | Bennett | 370/471 |
| 5,610,745 | | 3/1997 | Bennett | 370/232 |
| 5,619,510 | | 4/1997 | Kurano | 370/395 |

* cited by examiner

*Primary Examiner*—Douglas Olms
*Assistant Examiner*—Shick Hom
(74) *Attorney, Agent, or Firm*—William J. Kubida, Esq.; Richard & Bachand, Esq.

(57) ABSTRACT

The present invention is a fiber channel switch employing a distributed queuing algorithm for interconnecting a plurality of devices (workstations, supercomputer, peripherals) through their associated node ports (N_ports) and employs a fabric having a shared memory coupled to a plurality of fabric ports (F_ports) through a bi-directional bus over which memory addresses, frame data and communications commands are transmitted. Each F_port includes a port controller employing a distributed queuing algorithm associated with a control network for communicating commands between the ports related to when and where frame transfers should be made, wherein the bi-directional bus provides an independent data network for access to the shared memory such that frames can be transferred to and from the shared memory in response to port controller commands.

22 Claims, 5 Drawing Sheets

FIBRE CHANNEL SWITCH EMPLOYING DISTRIBUTED QUEUING

RELATED APPLICATIONS

The present application is a continuation of U.S. patent application Ser. No. 08/975,938 filed Nov. 21, 1997, now abandoned which was a continuation of U.S. patent application Ser. No. 08/714,029 filed Sep. 11, 1996, now U.S. Pat. No. 5,894,481 both incorporated herein by reference, from which priority under 35 U.S.C. § 120 is claimed and which are assigned to the assignee of the present application.

FIELD OF THE INVENTION

The present invention relates an apparatus for distributed source and destination queuing in a high performance memory based switch and, more particularly, to a Fibre channel switch having a distributed queuing algorithm.

BACKGROUND OF THE INVENTION

Mainframes, super computers, mass storage systems, workstations and very high resolution display subsystems are frequently connected together to facilitate file and print sharing. Common networks and channels used for these types of connections oftentimes introduce communications bottle necking, especially in cases where the data is in a large file format typical of graphically-based applications.

There are two basic types of data communications connections between processors, and between a processor and peripherals. A "channel" provides a direct or switched point-to-point connection between communicating devices. The channel's primary task is merely to transport data at the highest possible data rate with the least amount of delay. Channels typically perform simple error correction in hardware. A "network," by contrast, is an aggregation of distributed nodes (e.g., workstations, mass storage units) with its own protocol that supports interaction among these nodes. Typically, each node contends for the transmission medium, and each node must be capable of recognizing error conditions on the network and must provide the error management required to recover from the error conditions One type of communications interconnect that has been developed is Fibre Channel. The Fibre channel protocol was developed and adopted as the American National Standard for Information Systems (ANSI). See *Fibre Channel Physical and Signaling Interface, Revision* 4.2, American National Standard for Information Systems (ANSI) (1993) for a detailed discussion of the fibre channel standard. Briefly, fibre channel is a switched protocol that allows concurrent communication among workstations, super computers and various peripherals. The total network bandwidth provided by fibre channel is on the order of a terabit per second. Fibre channel is capable of transmitting frames at rates exceeding 1 gigabit per second in both directions simultaneously. It is also able to transport commands and data according to existing protocols such as Internet protocol (IP), small computer system interface (SCSI), high performance parallel interface (HIPPI) and intelligent peripheral interface (IPI) over both optical fiber and copper cable.

FIG. 1 illustrates a variable-length frame 11 as described by the Fibre Channel standard. The variable-length frame 11 comprises a 4-byte start-of-frame (SOF) indicator 12, which is a particular binary sequence indicative of the beginning of the frame 11. The SOF indicator 12 is followed by a 24-byte header 14, which generally specifies, among other things, the frame source address and destination address as well as whether the frame 11 is either control information or actual data. The header 14 is followed by a field of variable-length data 16. The length of the data 16 is 0 to 2112 bytes. The data 16 is followed successively by a 4-byte CRC (cyclical redundancy check) code 17 for error detection, and by a 4 byte end-of-frame (EOF) indicator 18. The frame 11 of FIG. 1 is much more flexible than a fixed frame and provides for higher performance by accommodating the specific needs of specific applications.

FIG. 2 illustrates a block diagram of a representative fibre channel architecture in a fibre channel network 100. A workstation 120, a mainframe 122 and a super computer 124 are interconnected with various subsystems (e.g., a tape subsystem 126, a disk subsystem 128, and a display subsystem 130) via a fibre channel fabric 110 (i.e. fibre channel switch). The fabric 110 is an entity that interconnects various node-ports (N_ports) 140 and their associated workstations, mainframes and peripherals attached to the fabric 110 through the F_ports 142. The essential function of the fabric 110 is to receive frames of data from a source N_port and, using a first protocol, route the frames to a destination N_port. In a preferred embodiment, the first protocol is the fibre channel protocol. Other protocols, such as the asynchronous transfer mode (ATM) could be used without departing from the scope of the present invention.

Essentially, the fibre channel is a channel-network hybrid, containing enough network features to provide the needed connectivity, distance and protocol multiplexing, and enough channel features to retain simplicity, repeatable performance and reliable delivery. Fibre channel allows for an active, intelligent interconnection scheme, known as a "fabric," or fibre channel switch to connect devices. The fabric includes a plurality of fabric-ports (F_ports) that provide for interconnection and frame transfer between a plurality of node-ports (N_ports) attached to associated devices that may include workstations, super computers and/or peripherals. The fabric has the capability of routing frames based upon information contained within the frames. The N_port manages the simple point-to-point connection between itself and the fabric. The type of N_port and associated device dictates the rate that the N_port transmits and receives data to and from the fabric. Transmission is isolated from the control protocol so that different topologies (e.g., point-to-point links, rings, multidrop buses, cross point switches) can be implemented.

The Fibre Channel industry standard also provides for several different types of data transfers. A class 1 transfer requires circuit switching, i.e., a reserved data path through the network switch, and generally involves the transfer of more than one frame, oftentimes numerous frames, between two identified network elements. In contrast, a class 2 transfer requires allocation of a path through the network switch for each transfer of a single frame from one network element to another.

Frame switching for class 2 transfers is more difficult to implement than class 1 circuit switching as frame switching requires a memory mechanism for temporarily storing incoming frames in a source queue prior to their routing to a destination port, or a destination queue at a destination port. A memory mechanism typically includes numerous input/output (I/O) connections with associated support circuitry and queuing logic. Additional complexity and hardware is required when channels carrying data at different bit rates are to be interfaced.

It is known to employ centralized queuing that is inherently slow as a common block of logic must be employed for all routing decisions within the switch.

It is also known to employ distributed source queuing which has apparent disadvantages when the frame at the head of the queue is destined to a port that is already forwarding a frame such that the path is blocked and the frame cannot be transferred. Alternatively, it is known to employ distributed destination queuing, which has the apparent disadvantage of a large destination queue at each port as it is possible for all frames within the switch to be simultaneously queued to the same destination port.

Another disadvantage of distributed destination queuing is apparent when the frame at the end of the head of the queue is sourced from a port that is already forwarding a frame such that the path is blocked and the frame cannot be transferred.

Thus, a heretofore unaddressed need exists in the industry for new and improved systems for implementing the Fibre Channel industry standard for class 2 transfers on fiber optic networks with much higher performance and flexibility than presently existing systems. Particularly, there is a significant need for a method and apparatus that combines both distributed source and destination queuing in a high performance memory based switch.

A need also exists to implement distributed queues between the source and destination ports, requiring the lower queue storage resources of source queuing, but providing the high throughput of destination queuing and avoiding "head-of-line" blocking of either source or destination queuing.

It would be desirable and of considerable advantage to provide a Fibre channel switch that provides for efficient transfer of queuing information between Fibre channel ports, especially if the new switch provided an improvement in any of the following areas: increased bandwidth, decreased no-load latency and increased throughput under load (due to parallelism of distributed queuing).

It will be apparent from the foregoing that there is still a need for a High-Bandwidth memory-based switch employing distributed queuing that differs from that employed in existing centralized Fibre Channel switch architectures.

SUMMARY OF THE INVENTION

In accordance with the invention, there is provided a fibre channel switch employing distributed source and destination queuing for interconnecting a plurality of devices (workstations, supercomputer, peripherals) through their associated node ports (N_ports). The fibre channel switch provides a fabric having a shared memory coupled to a plurality of fabric ports (F_sorts) through a bit-slicing memory controller over which memory addresses, frame data and communications commands are transmitted. Each F_port includes a port controller employing a distributed queuing algorithm associated with a control network for communicating commands between the ports related to when and where frame transfers are to be made. The bit-slicing memory controller provides an independent data network for access to the shared memory such that frames can be transferred to and from the shared memory in response to port controller commands.

Each port controller further comprises a link controller (LC) for controlling the optical interface with the N_port, a frame transfer controller (FTC) for receiving and transmitting data between the LC and the shared memory, an address validation/translation controller (AVTC) for obtaining frame header information and for generating destination port numbers, buffer numbers, and timeout values, and a writer and reader that together implement distributed source/ destination queuing, a synchronizer (sync) for synchronizing port state transitions and the activities of the reader and writer, a statistics controller (SC) for counting statistics, and a port communications controller (PCC) for enabling port controllers to communicate.

Other aspects and advantages of the present invention will be come apparent from the following detailed description, taken in conjunction with the accompanying drawings, illustrating by way of example the principles of the invention.

DETAILED DESCRIPTION OF THE PREFERRED EMBODIMENTS

Briefly, the present invention provides a Fibre Channel switch based upon a distributed queuing algorithm for interconnecting a plurality of devices through their associated node ports (N_ports) The fibre channel switch provides a fabric having a shared memory coupled to a plurality of fabric ports (F_ports) through a bit-slicing shared memory controller through which memory addresses, frame data are transmitted. The Fibre Channel switch supports both circuit and frame switched connections for multiple baud rate interfaces.

Figure 1:
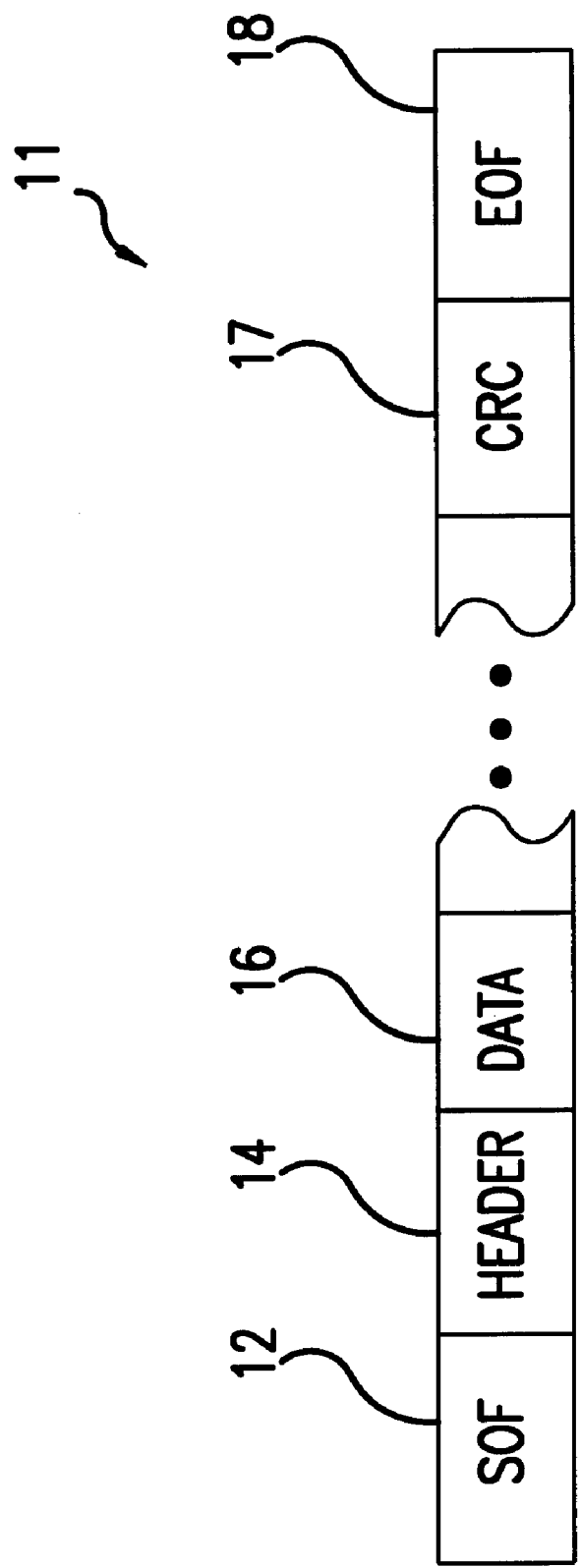
FIG. 1 is a schematic representation of a variable-length frame communicated through a fiber optic switch of a fiber optic network in accordance with the Fibre Channel industry standard.
Figure 2:
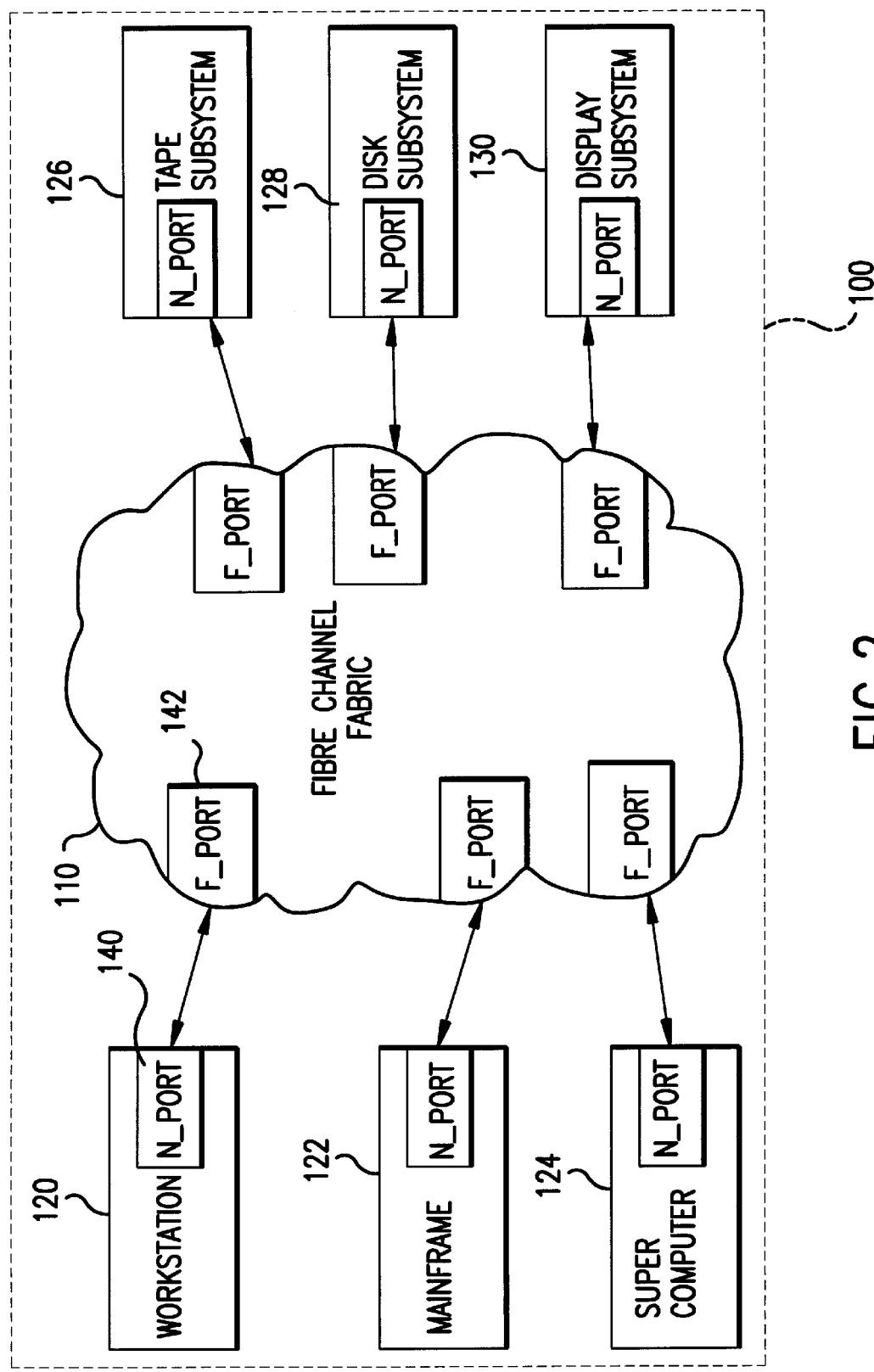
FIG. 2 depicts a block diagram of a representative Fibre Channel architecture.
Figure 3:
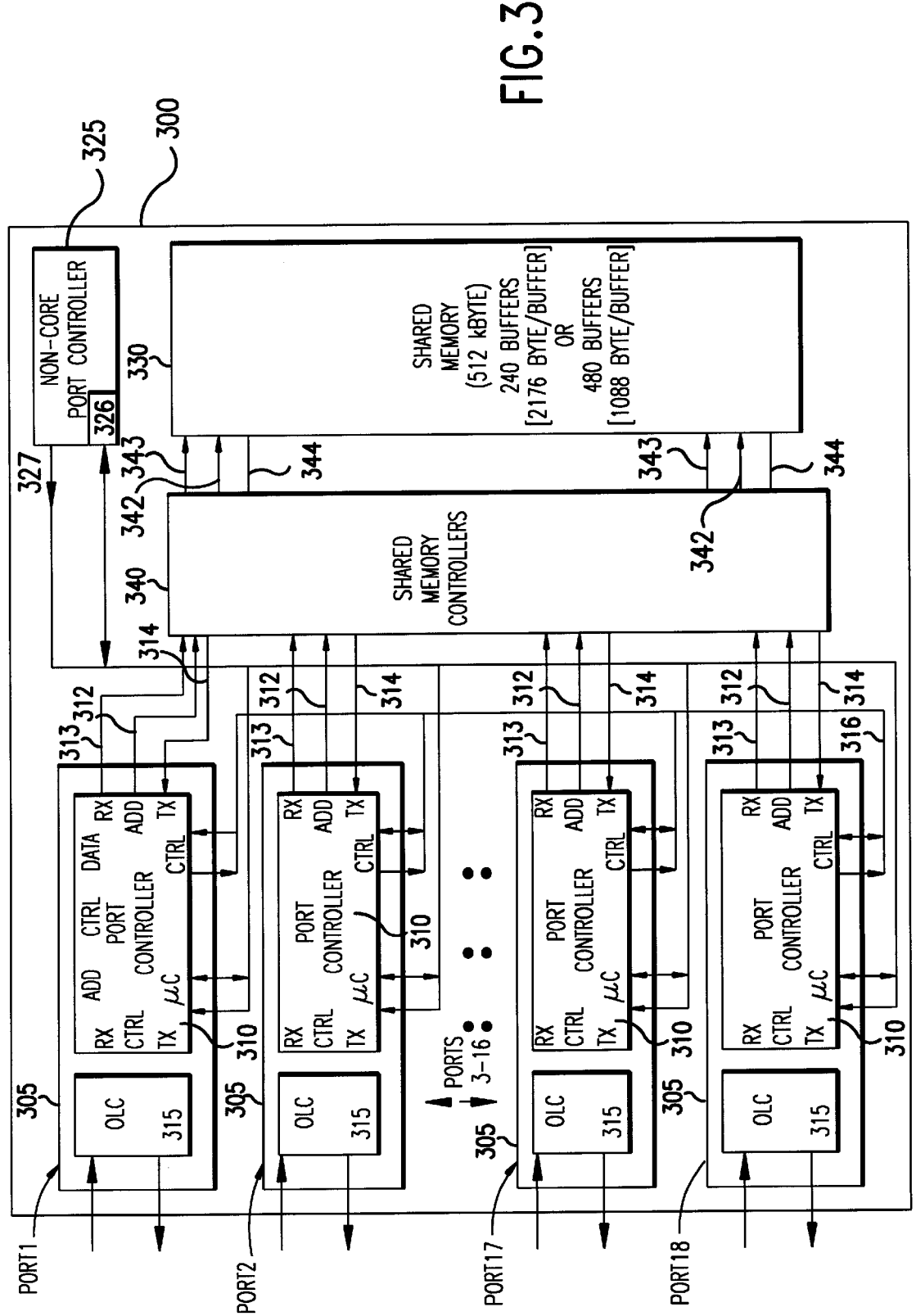
FIG. 3 illustrates a block diagram of a Fibre Channel switch according to the present invention.

FIG. 3 illustrates a block diagram of an Fibre Channel switch 300 having eighteen ports 305 numbered Port 1 to Port 18 (only Port 1, Port 2, Port 17 and Port 18 are illustrated) coupled to a 512 kByte shared memory 330 through a bit-slicing memory controller 340. Each of the eighteen ports 305 include a port controller 310 having memory address (ADD) lines 312 for transmitting memory addresses and Rx lines 313 for transmitting frame data to the bit-slicing memory controller 340, and Tx lines 314 for receiving frame data from the bit-slicing memory controller 340, and an OLM/GLC media adapter 315 for interfacing to the Fibre channel.

A bit-sliced memory architecture is disclosed in U.S. patent application Ser. No. 08/330,279, filed Oct. 27, 1994 and entitled "Channel Module for a Fibre Optic Switch with Bit Sliced Memory Architecture for Data Frame Storage" by Dwayne Bennett and is hereby incorporated by reference. The memory architecture disclosed in 08/330,279 teaches only bit slicing of the Rx frame data. The preferred embodiment of the invention employs bit-slicing of both the Rx frame data and the Tx frame data. This allows the shared memory 330 to be used not only for data frame storage, but also for the multiplexing function delivered by the bit-slicing memory controller 340.

An independent communications command bus 316 provides interconnections between the eighteen port controllers 310 and is employed for sending communication commands related to the timing and destination of frame transfers. The switch 300 also includes a single non-core port controller 325 interconnected with each port controller 310 over a micro controller bus 327.

Figure 4:
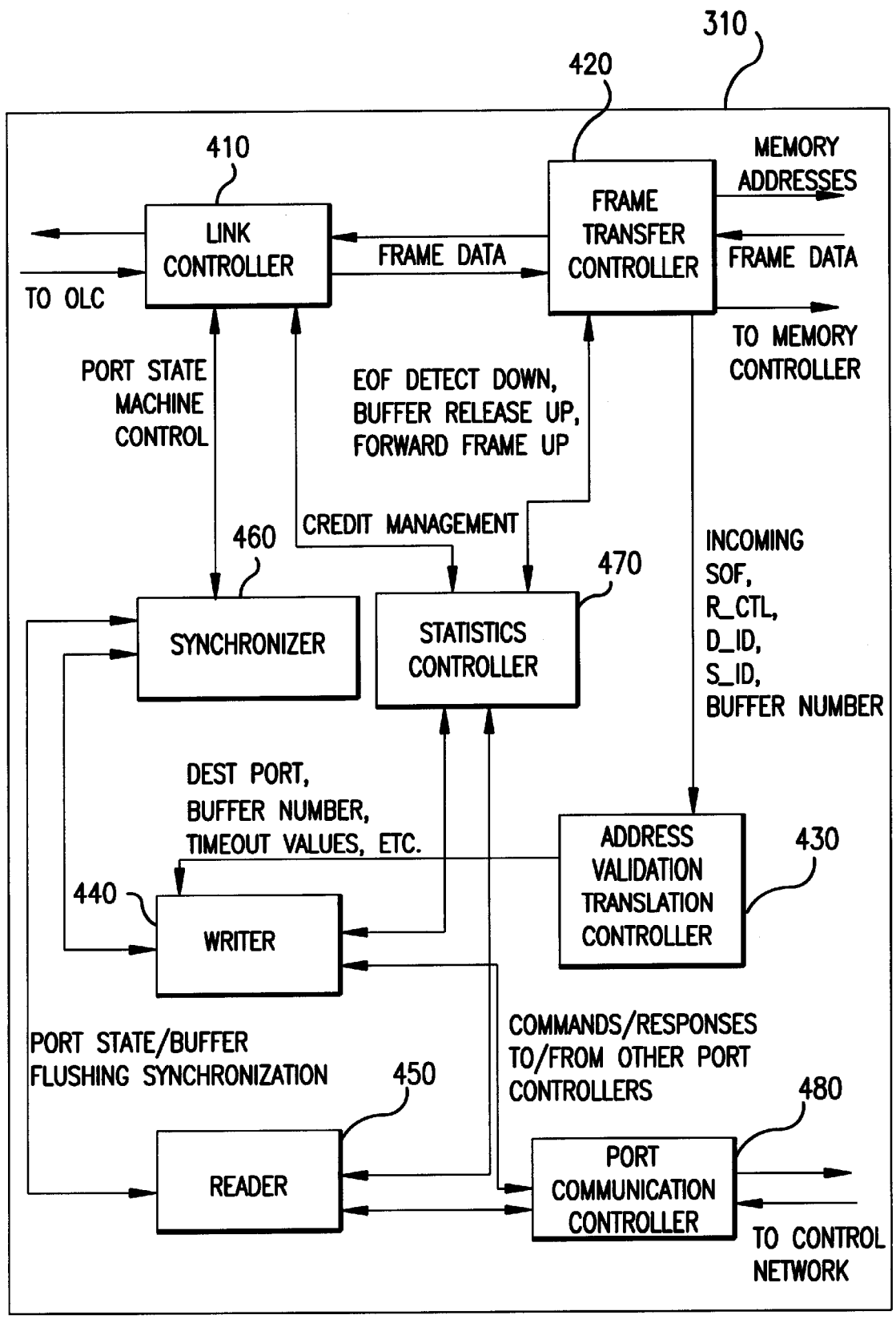
FIG. 4 illustrates a block diagram of a port controller located within the Fibre Channel switch illustrated in FIG. 3.

FIG. 4 illustrates a block diagram of a port controller 310 illustrated in FIG. 3, comprising a link controller (LC) 410, a frame transfer controller (FTC) 420, an address validation/translation controller (AVTC) 430, a writer 440 and reader 450, a synchronizer (sync) 460, a statistics controller (SC) 470, and a port communications controller (PCC) 480.

The link controller 410 further comprises a control processor for OLC control (lock-to-ref, loopback control, etc.), elastic store, 8B/10B conversion, work synchronization, ordered set encoding/decoding, port state machine (offline to online protocol, link recovery handshaking, etc.), CRC generation and checking, and frame validation.

The FTC 420 is an interface for receiving and transmitting data between the LC 410 and the shared memory controller 340. Upon recei_t of data from the LC 410, the FTC 420 forwards the memory address and the data to the shared controller memory 340. The memory address is based on the available source buffers. The FTC 420 tells the writer 440 which destination port and receive buffer the frame has been put in via the address validation/translation controller (AVTC) 430, such that the designated receive buffer will not be reused until the reader 440 tells it to reclaim the receive buffer. When transmitting data, the FTC 420 gets a message from the reader 450 (originating from the control network, through the port communication controller 480) to retrieve a frame from the shared memory 330 and send it to the destination F_port via the LC 410 and the OLC 315. The FTC 420 determines the memory address from the source port and buffer number contained in the message from the reader 450. When the FTC 420 passes the EOF to the LC 410, it signals the reader 450 to indicate that the transfer is complete.

The AVTC 430 gets frame header information of inbound frames from the FTC 420. The frame header information includes: SOF, frame header words 1 and 2, and buffer number. The AVTC 30 also generates the following outputs to the writer 440: a destination port number, buffer number, forward frame timeout value, and busy frame timeout value and a flag indicating if the frame would be forwarded or rejected/discarded. The writer 440 and reader 450 of each port controller in the switch together implement distributed source/destination queuing. Each source port maintains a separate queue for each destination port, and each queue contains only frames received by that particular source port, resulting in a separate queue for each source/destination port combination in the switch. The queues are distributed because each source port passes the buffer descriptor at the head of its destination queues to the destination port before the source port is actually ready to forward the frame. Thus, the destination port knows about the next frame that each of the source ports wants to forward to it next.

When the destination port begins forwarding a frame from a particular source port, the destination port requests the next buffer descriptor in the source port queue. Depending on the latency of the request and response between the two port controllers and the length of the frame being transmitted, the destination port will get the next buffer descriptor before or at approximately the same time transmission of the current frame completes. By overlapping these two operations, a very high rate of sustained bandwidth can be maintained between two ports sending frames back and forth to each other. When the destination port has seen the EOF command go out, the destination port sends a message to the source port telling the source port to free up the source buffer and send a receiver ready (RRDY) command.

Source blocking does not occur in a shared memory architecture as the destination port is free to choose a buffer from any source port. The destination port is therefore free to use any forwarding priority scheme the destination port desires. A simple round-robin scheme is employed for fairness. Alternatively, a priority scheme may be employed that gives higher priority to a particular source port, or to pace the traffic from a source port that is flooding the destination port with frames (i.e., class 3 traffic that isn't paced by end-to-end flow control) by servicing it less often than the other ports, for example, based on traffic history. The source prioritizes frames to each destination port based on frame type. For example, link control frames may be given higher priority than data frames in a simple first-come first-serve scheme.

Upon passing a buffer descriptor to the destination port, the source port controller must remember the frame. In particular, a busy frame signal must be sent back to source N_Port, or the frame must be discarded if the frame cannot be forwarded out of the destination port within some fixed time. In the preferred embodiment of the invention, the source port has responsibility for timing the frame upon passing of the buffer descriptor. Alternatively, the destination port may have responsibility for timing the frame and will forward a request to the source port to return a busy frame signal when the timer times out. The source port may be link reset, requiring the cortents of the buffer to be discarded. The source port therefore still needs to be able to stop the destination port from forwarding the frame, and the same race condition exists between the destination port starting to forward the frame and the source port telling the destination port not to forward. The source port retains responsibility for timing the frame as the source port must time the frame until the source port buffer descriptor makes it to the head of the queue and is passed to the destination port.

When a port goes offline, there is a period of time during which the switch hardware must reject frames on its own until the address validation tables are updated by software. Rather than requiring a source port controller to be aware of the port state of all the other ports, frames will continue to be requested by the port controller of the offline port, and it will respond to a buffer descriptor from the source with a reject message. This also applies to frames sent to a port that is in link recovery.

The amount of logic required in the FTC portion of the port controller is reduced as the source port is not required to generate busy and reject frame commands. Instead, the buffer descriptor of the frame to be busied or rejected is queued to a "non-core" port controller 325 (FIG. 3) having an imbedded processor 326. Software is employed to manipulate the frame header, and queuing the frame back out to the original source port. While the original frame is queued to the "non-core" port controller 325, the source continues to time the frame. If the frame is not forwarded within a predetermined period of time, the source port makes a request to the "non-core" port controller 325 not to forward the original frame to the processor. If the frame does make it the processor, and the reject/busy frame is queued back to the source, the "non-core" port controller must time the frame and discard it if necessary. In the preferred embodiment, the timer within the "non-core" port controller should take into account the time between when the frame was first queued to the "non-core" port controller 325 and when it was actually delivered to it. The buffer information passed to the "non-core" port controller 325 includes a time stamp. The processor time stamps frames upon receipt such that a time out value can be calculated that will ensure that in the worst case, the frame is discarded within R_A_TOV.

A synchronizer (sync) 460 is employed for synchronizing port state transitions and the activities of the reader 450 and writer 440. For example, when a port goes into link recovery, the synchronizer 460 prevents the link controller 410 from taking the link active again until the writer has freed up all of the source buffers by either discarding the frames or waiting for a destination to complete transmission of a frame. The synchronizer 460 also waits for the reader to recognize that the port is no longer active and aborts the current forward operation or waits until it is finished. The synchronizer 460 does basically the same thing when the port goes offline or into link failure, but it must also wait for software to tell it that the port has been logged out of the fabric before allowing the link controller 410 to take the link back on-line.

The statistics controller (SC) 470 is located between the reader/writer and the LC/FTC such that it can count statistics, and pass information through, for example, when the writer 440 releases a buffer, the SC 470 tells the FTC 420 that the buffer space is available and also tells the LC 410 to send a receiver ready (RRDY) signal. When the reader 450 decides a frame can be forwarded, the SC 470 is given the source port and buffer number information, allowing it to count frames transmitted on a per destination port basis, and it also passes the information on to the frame transfer controller so it calculates the shared memory address of the frame data. The SC 470 connection to the FTC 420 and LC 410 would also allow Fibre channel class one error and word count statistics to be counted if required.

The port communication controller (PCC) 480 allows port controllers 310 to communicate with one another. More specifically, writers 440 communicate with readers 450 and vice-versa, but readers 450 don't communicate with one another, nor do writers 440. Each port controller 310 has a single serial output line that is connected to all the ports (including itself so that an N_Port can send frames to itself). In an 18 port switch, each port controller will have one serial output and 18 serial inputs. Messages must include the intended destination port number so that the destination ports can ignore messages that are not addressed to it. The source port number need not be included, it is implicit based on which serial input the message was received from. The serial lines would be clocked at 26 or 53 Mhz.

Figure 5:
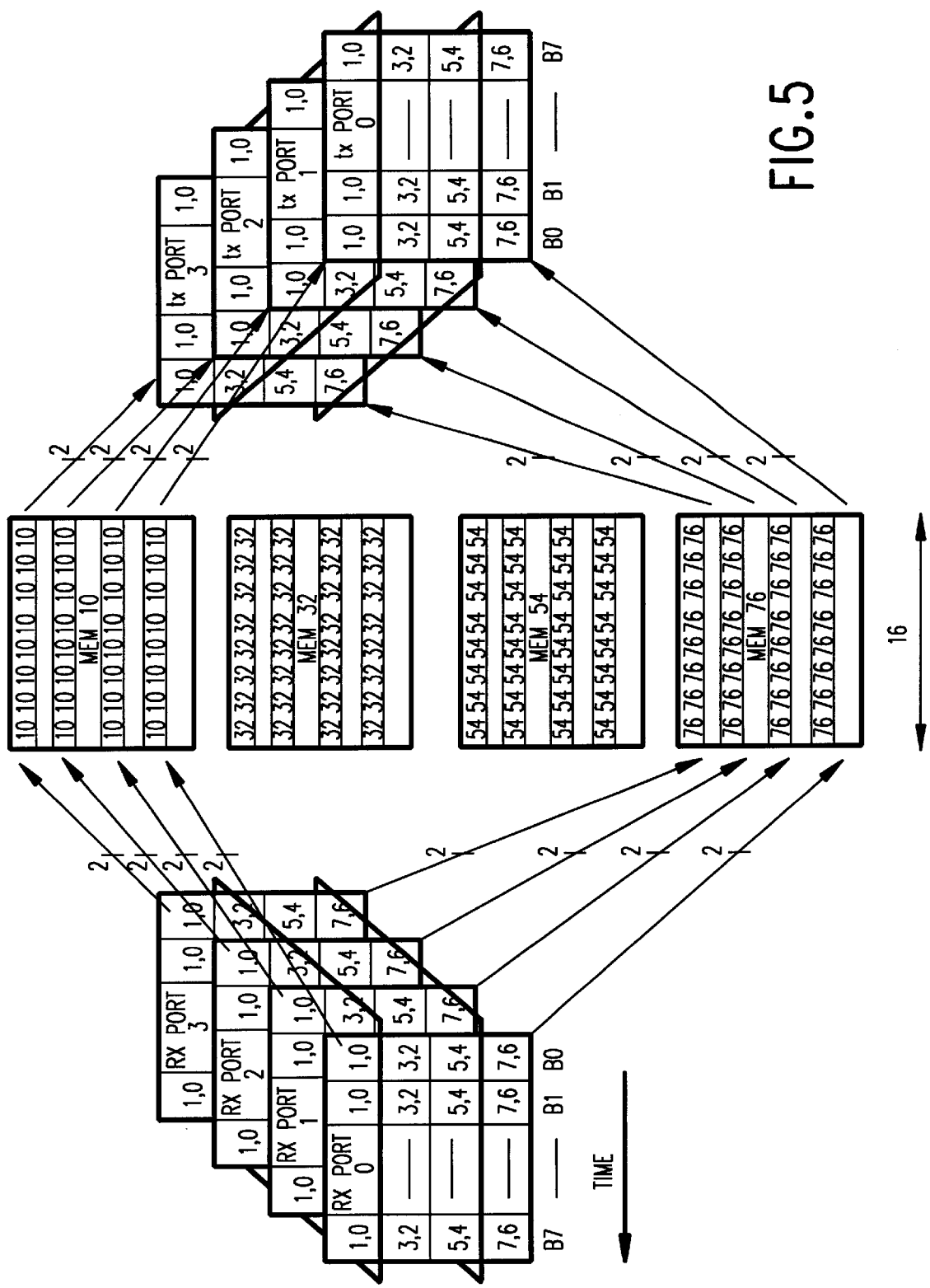
FIG. 5 illustrates the data organization for a bit-sliced memory in accordance with the invention as embodied in a simplified four port fibre channel switch.

FIG. 5 illustrates data organization for a bit-sliced memory in accordance with the invention as embodied in a simplified four port fibre channel switch. B0 to B7 indicates bytes 0 through 7 accumulated over eight clock cycles. The numbers in the memory locations indicate bit positions. A write to a memory location is sixteen bits wide (eight two bit slices, from eight bytes are concatenated), meanwhile, all four memories are written at the same time. Each read cycle delivers eight bytes of data corresponding to a particular port as directed by a shared memory controller.

While the invention has been described and illustrated with reference to specific embodiments employing four ports and a 512 kByte shared memory, those skilled in the art will recognize that modification and variations may be made such that the invention is equally applicable to much larger numbers of ports and memory.

What is claimed is:

1. A bit-sliced memory based switch comprising:
   a plurality of first and second ports;
   a frame transfer controller FTC for receiving data frames from said plurality of first ports and for forwarding memory address information and data from said data frames;
   a plurality of memory buffers coupled to said frame transfer controller, wherein, each of said plurality of first ports is operative for transferring memory address information and data in multiple bit slices to each of said plurality of memory buffers;
   a shared memory controller connectable to said plurality of memory buffers and responsive to said memory address information to place said memory address information and data in said memory buffers, the shared memory controller informing the FTC which buffer the memory address information and data has been placed in; and
   a reader responsive to an external request from one of said plurality of second ports to retrieve data and generate a retrieve message to said FTC, said retrieve message indicating a buffer number, wherein the FTC determines the memory address information and data from the buffer number of said retrieve message and uses the shared memory controller to retrieve at least a portion of said memory address information and data transferred by said plurality of first ports in multiple bit slices from each of said plurality of memory buffers.

2. The bit-sliced memory based switch of claim 1 wherein said plurality of memory buffers is equal in number to at least said plurality of first and second ports.

3. The bit-sliced memory based switch of claim 1 wherein said first ports comprise receive ports and said second ports comprise transmit ports.

4. The bit-sliced memory based switch of claim 3 wherein said receive and transmit ports comprise fibre channel ports.

5. The bit-sliced memory based switch of claim 1 wherein said memory buffers are at least one data word in width.

6. The bit-sliced memory based switch of claim 5 wherein said data word is 16 bits in width.

7. The bit-sliced memory based switch of claim 1 wherein said multiple bit slices are transferred to, and retrieved from, said plurality of memory buffers substantially concurrently.

8. The bit-sliced memory based switch of claim 1 wherein each of said multiple bit slices are transferred to, and retrieved from, said plurality of memory buffers on a single clock cycle.

9. The bit-sliced memory based switch of claim 1 wherein said data comprises port address data and user data.

10. A method for transferring data from each of a plurality p1 of first ports to any of a plurality p2 of second ports, said first and second ports having a bandwidth b, said method comprising:
    providing a shared memory, said shared memory further comprising n memory buffers intermediate said plurality of first ports and said plurality of second ports, wherein said memory buffers are operative for transferring said data in multiple bit slices to each of said n memory buffers;
    including a frame transfer controller FTC for receiving data from said plurality of first ports and for forwarding said data to said plurality of second ports;
    transferring said data from each of said plurality of first ports to each-of said n memory buffers in multiple bit slices;

receiving a message originating from a control network to retrieve a frame from the shared memory and send it to a specified one of the plurality of second ports;

determining a memory address from any of a plurality of first ports and a buffer number contained in the data; and receiving said data from said n memory buffers by each of said plurality of second ports in multiple bit slices, wherein the bandwidth of each of said memory buffers in said shared memory is substantially equal to $b \times (p1+p2)/n$.

11. The method of claim 10 wherein said step of providing is carried out by furnishing memory buffers which are at least one data word in width.

12. The method of claim 11 wherein said step of furnishing is carried out by memory buffers which are 16 bits in width.

13. The method of claim 11 wherein said steps of transferring and receiving occur substantially concurrently.

14. The method of claim 11 wherein said steps of transferring and receiving each of said multiple bit slices occur on a single clock cycle.

15. A bit-sliced shared memory comprising:

a common pool of n number of memory buffers;

a plurality p1 of receiving ports having a bandwidth b1, each of said plurality of receiving ports being coupled to each of said n number of memory buffers, wherein data is transferred to each of said n number of memory buffers by said plurality p1 of receiving ports in multiple bit slices of said data;

a plurality p2 of transmitting ports having a bandwidth b2, each of said plurality of transmitting ports being coupled to each of said n number of memory buffers, wherein data is retrieved from each of said n number of memory buffere by said plurality p2 of transmitting ports in multiple bit slices of said data, and wherein the bandwidth of each of said n number of memory buffers is substantially $(p1 \times b1 + p2 \times b2)/n$; and a frame transfer controller FTC for receiving data from said plurality of receiving ports and for forwarding said data to said plurality of transmitting ports.

16. The bit-sliced shared memory of claim 15 wherein said n number of memory buffers is equal to said plurality p of receiving and transmitting ports.

17. The bit-sliced shared memory of claim 15 wherein said receive and transmit ports comprise fibre channel ports.

18. The bit-sliced shared memory of claim 15 wherein said memory buffers are at least one data word in width.

19. The bit-sliced shared memory of claim 18 wherein said data word is 16 bits in width.

20. The bit-sliced shared memory of claim 15 wherein said multiple bit slices are transferred to, and retrieved from, said n number of memory buffers substantially concurrently.

21. The bit-sliced shared memory of claim 15 wherein each of said multiple bit slices are transferred to, and retrieved from, said n number of memory buffers on a single clock cycle.

22. The bit-sliced shared memory of claim 15 wherein said data comprises port address data and user data.

* * * * *